United States Patent [19]
Raidel, Sr.

[11] Patent Number: 5,458,360
[45] Date of Patent: Oct. 17, 1995

[54] TANDEM AXLE SUSPENSION WITH LEAF SPRING GUIDED FORWARD AXLE SUSPENSION AND TORQUE BEAM GUIDED REAR AXLE SUSPENSION CONNECTED BY A LOAD EQUALIZING BOLSTER BEAM

[76] Inventor: John E. Raidel, Sr., Rte. 9, Box 400-M, Springfield, Mo. 65804

[21] Appl. No.: 71,470

[22] Filed: Jun. 3, 1993

[51] Int. Cl.⁶ .................................................. B60G 5/00
[52] U.S. Cl. ........................... 280/686; 280/683; 280/712
[58] Field of Search ...................... 280/676, 686, 280/682, 680, 677, 678, 712, 713, 683

[56] References Cited

U.S. PATENT DOCUMENTS

| | | | |
|---|---|---|---|
| 2,905,459 | 9/1959 | Fikse | 280/713 |
| 3,295,623 | 1/1967 | Kyzer | 280/683 |
| 3,434,707 | 3/1969 | Raidel | 267/31 |
| 3,499,660 | 3/1970 | Raidel | 280/682 |
| 3,510,149 | 5/1970 | Raidel | 280/712 |
| 3,614,123 | 10/1971 | Raidel | 280/686 |
| 3,625,538 | 12/1971 | Raidel | 280/686 |
| 3,912,294 | 10/1975 | Raidel | 280/679 |
| 4,093,272 | 6/1978 | Raidel | 280/686 |
| 4,741,553 | 5/1988 | Raidel, II | 280/682 |
| 4,756,550 | 7/1988 | Raidel | 280/683 |
| 4,946,190 | 8/1990 | Büttner | 280/712 |

*Primary Examiner*—Mitchell J. Hill
*Assistant Examiner*—Paul N. Dickson
*Attorney, Agent, or Firm*—Rogers, Howell & Haferkamp

[57] ABSTRACT

The present invention provides a tandem axle suspension of the type disclosed in U.S. Pat. No. 4,741,553, for use with trailer tag axles with structural modifications being made thereto adapting the tandem axle suspension of the present invention for use with a vehicle having a tandem pair of drive axles. The suspension includes a torque spring bracket that enables torque springs to be easily assembled to or disassembled from the suspension assembly, the spring bracket being equally well suited for tandem axle suspensions as well as single axle suspensions.

31 Claims, 3 Drawing Sheets

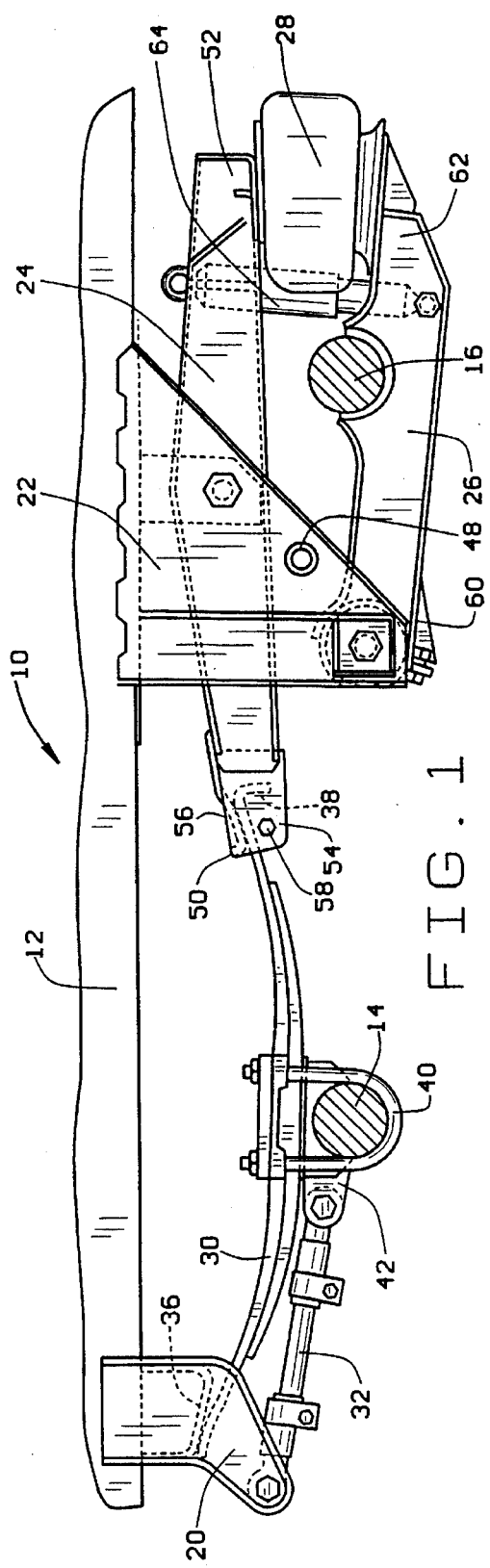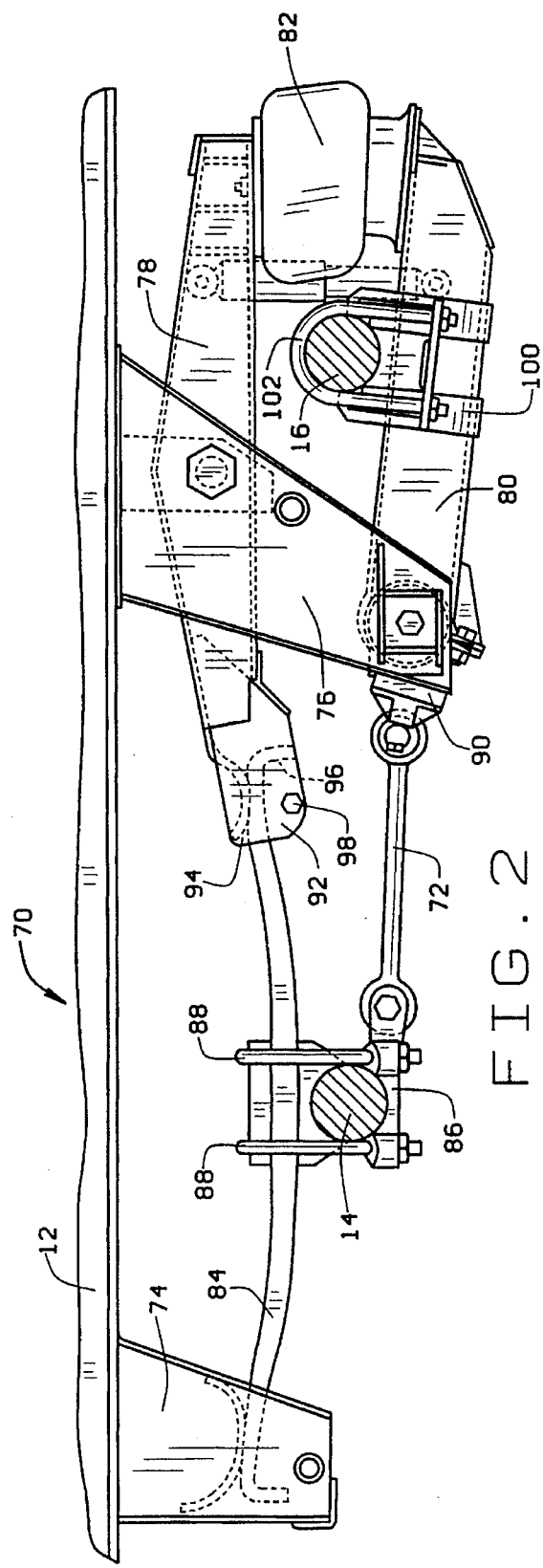

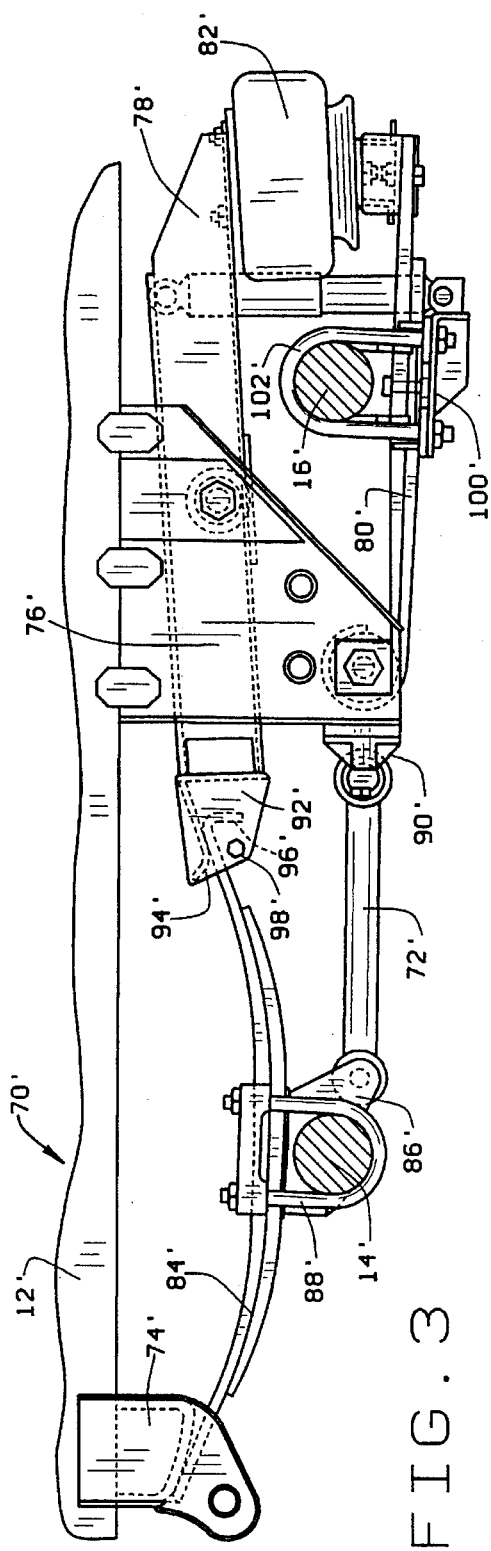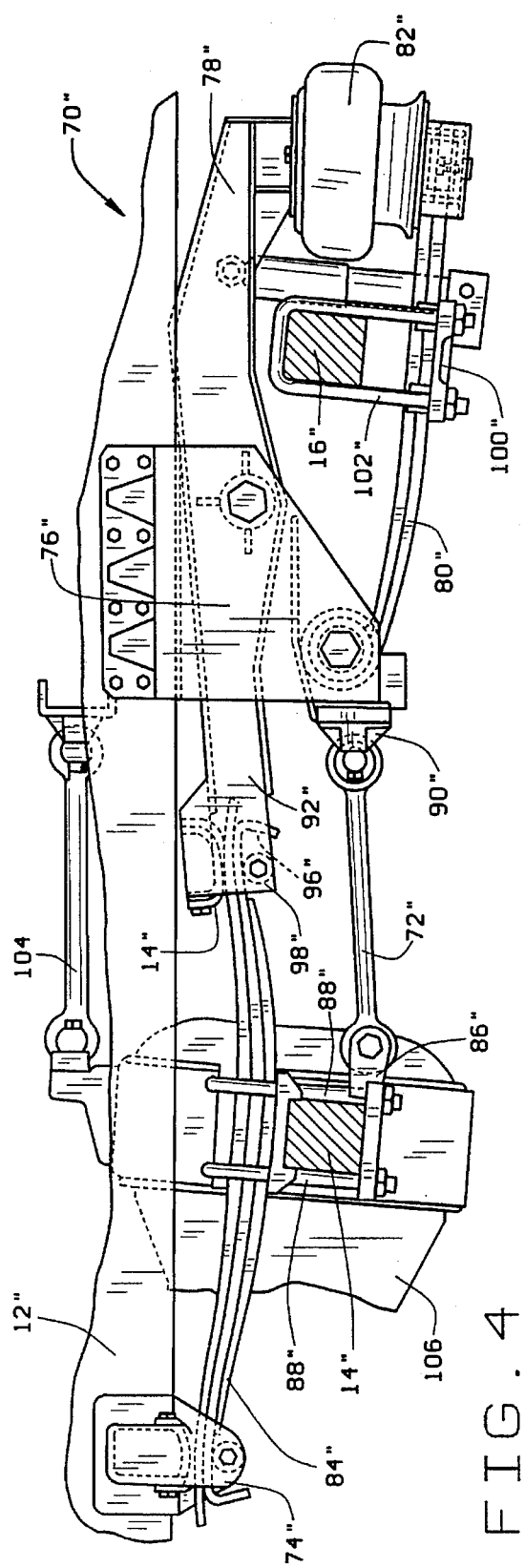

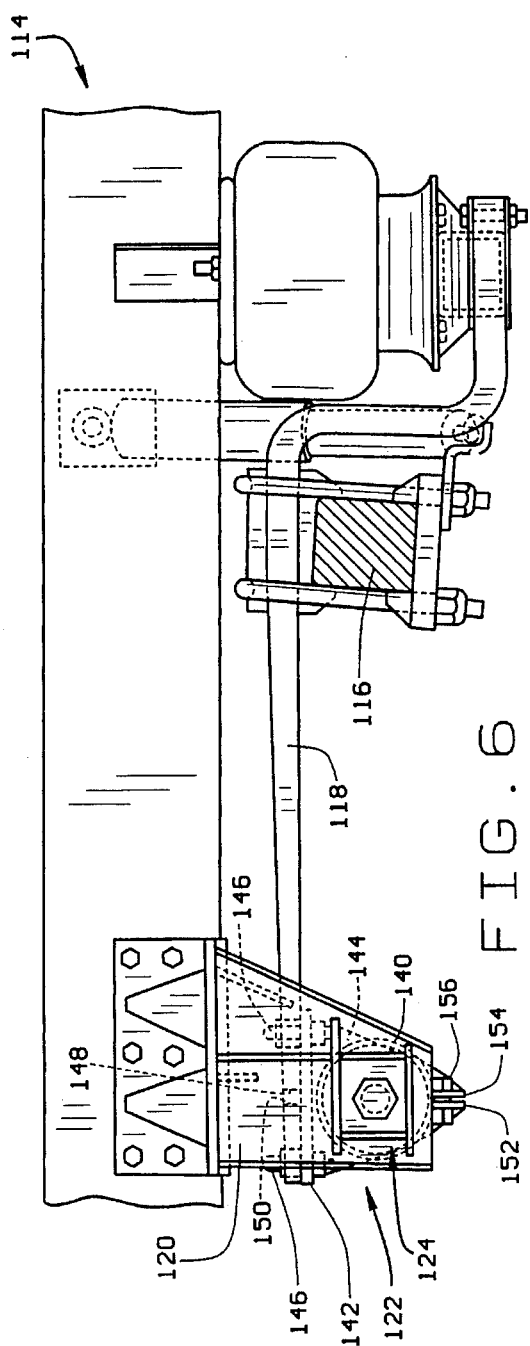
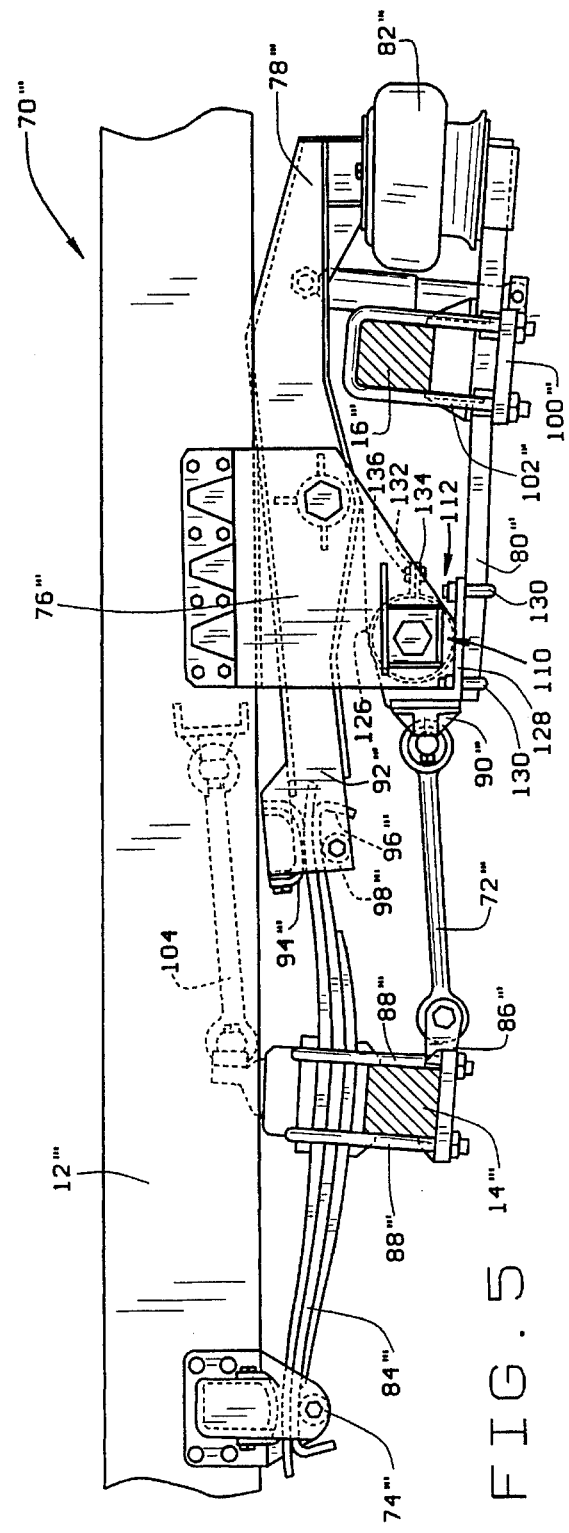

TANDEM AXLE SUSPENSION WITH LEAF SPRING GUIDED FORWARD AXLE SUSPENSION AND TORQUE BEAM GUIDED REAR AXLE SUSPENSION CONNECTED BY A LOAD EQUALIZING BOLSTER BEAM

BACKGROUND OF THE INVENTION

1. Field of the Invention

The present invention provides a tandem axle suspension of the type disclosed in U.S. Pat. No. 4,741,553, for use with trailer tag axles with structural modifications being made thereto adapting the tandem axle suspension of the present invention for use with a vehicle having a tandem pair of drive axles.

2. Description of the Related Art

Tandem axle suspension systems are commonly employed with trailers having one or more trailing axles. An example of such a prior art tandem axle suspension system is disclosed in U.S. Pat. No. 4,741,553, incorporated herein by reference. This prior art suspension is comprised of an air spring suspension assembly combined with a leaf spring suspension assembly.

The leaf spring supports the trailer load on the forward axle of the trailer's tandem axles. The forward end of the leaf spring suspension assembly is mounted to a forward hanger secured to the trailer chassis. The rearward end of the leaf spring assembly is mounted to a forward end of a bolster beam that is itself pivotally mounted to a rearward hanger assembly. The rearward hanger is also secured to the chassis. A radius rod is typically connected from beneath the forward axle to the forward hanger to be pulled in tension and resist torsional forces exerted on the forward axle when the trailer is pulled.

The rearward hanger assembly also supports a torque beam mounted to the hanger assembly by a single bushing. The rearward axle of the trailer is mounted to the torque beam by two more bushings, and an air spring is connected between the torque beam and a rearward end of the bolster beam. This prior art tandem axle suspension system is specifically designed to support loads exerted on the system when the trailer is pulled and both the forward and rearward axles of the tandem are tag axles or provide no driving force. It should be appreciated that such a suspension system would not be adequate for use with a vehicle having tandem drive axles. Where both the forward and rearward axles of a tandem are powered by a vehicle's engine the torsional forces exerted on these axles when the vehicle first moves in driving operations are very different from those exerted on the tandem axles of a trailer where no driving torque is delivered to the axles. For example, with the forward axle being a drive axle the torsional forces exerted on the axle at the initiation of driving operations of the vehicle are opposite to those torsional forces exerted on a forward tag axle of a trailer being pulled. Therefore, the radius rod of the prior art tandem axle suspension systems that extends forward from beneath the front tag axle to a forward hanger to resist torsional forces exerted on a forward tag axle of a trailer would be insufficient to resist torsional forces exerted on a forward drive axle of a tandem axle vehicle. Moreover, the pair of bushings mounting the rear tag axle of a trailer to a torque beam could not withstand the torsional forces exerted on a similarly mounted drive axle over a period of use.

SUMMARY OF THE INVENTION

The present invention overcomes the problems associated with employing tandem axle suspension systems designed for trailers of the type disclosed in U.S. Pat. No. 4,741,553, by providing structural modifications to such suspension systems that enable the systems to be employed with tandem axle vehicles having both a forward and rearward drive axle. The tandem axle suspension system of the invention also employs a leaf spring assembly mounted to the forward drive axle and a torque beam mounted to the rearward drive axle. The forward end of the leaf spring is mounted to a forward hanger secured to the vehicle chassis and the rearward end of the leaf spring is mounted to a forward end of a bolster beam pivotally supported on a rearward hanger which is also secured to the vehicle chassis. A radius rod is secured to the forward drive axle and extends forward and is connected to the forward hanger in one embodiment, and extends rearward and is connected to the rearward hanger in other embodiments. The connection of the radius rod between the forward drive axle and the forward and rearward hangers is such that it causes the rod to be pulled in tension by torsional forces exerted on the forward axle during initial vehicle forward driving operations and also resists torsional forces exerted on the forward axle at each upshifting of the vehicle transmission during driving operations.

The torque beam is mounted to the hanger assembly by a single bushing and the rearward drive axle of the vehicle is rigidly secured to the torque beam in place of the two additional bushings employed in the prior art tandem axle trailer suspension system. The rigid connection of the rearward drive axle to the torque beam is better suited to withstand the torsional forces exerted on the axle during forward drive start-up and on upshifting. The bushing connecting the torque beam to the rearward hanger is the only bushing connecting the rearward drive axle to the rearward hanger. The single bushing connection of the torque beam to the rearward hanger replaces and simplifies the prior art connection of the rearward axle to the rearward hanger which required three bushings. In variant embodiments of the invention the torque beam is comprised of a rigid beam, or is comprised of a torque spring constructed from a leaf spring with one or more leaves. In the suspension embodiments employing a torque spring the suspension also includes a torque spring bracket that enables the torque spring to be easily assembled to or disassembled from the suspension assembly, the spring bracket being equally well suited for tandem axle suspensions as well as single axle suspensions.

BRIEF DESCRIPTION OF THE DRAWINGS

Further objects and features of the present invention are revealed in the following detailed description of the preferred embodiments of the invention and in the drawing figures wherein:

FIG. 1 is a side elevation view of a first embodiment of the suspension system of the invention;

FIG. 2 is a side elevation view of a second embodiment of the suspension system;

FIG. 3 is a side elevation view of a third embodiment of the suspension system;

FIG. 4 is a side elevation view of a fourth embodiment of the suspension system;

FIG. 5 is a side elevation view of a fifth embodiment of the suspension system; and, FIG. 6 is a side elevation view of a sixth embodiment of the suspension system.

DESCRIPTION OF THE PREFERRED EMBODIMENTS

The tandem axle suspension systems of the invention shown in FIGS. 1–5 are all variant embodiments of the same suspension system and all are improvements over the trailer tandem axle suspension system disclosed in U.S. Pat. No. 4,741,553, incorporated herein by reference. The embodiments of the suspension system of the invention are designed to be installed in pairs, one on each of the opposite lateral left and right sides of the vehicle chassis. The systems installed on the opposite sides of the vehicle are substantially identical and only the left side suspension system of each embodiment is disclosed herein, it being understood that the right side suspension system is substantially identical.

Referring to FIG. 1, the first embodiment of the suspension system 10 of the invention is shown installed on a chassis 12 of a vehicle having forward 14 and rearward 16 axles. It should be understood that the suspension system of the invention shown in FIG. 1 and the variant embodiments of the invention shown in drawing FIGS. 2–5 are all specifically designed to be employed with tandem axle vehicles wherein both axles are drive axles although they could also be employed with tag axle trailers. What is meant by a drive axle is that both axles of the tandem axle vehicle are supplied with a driving torque by a motor of the vehicle to rotate wheels of the vehicle mounted on opposite lateral ends of both of the drive axles.

The first embodiment of the suspension system shown in FIG. 1 is generally comprised of a forward hanger 20, a rearward hanger 22, a bolster beam 24, a torque beam 26, an air spring 28, a leaf spring 30, and a radius rod 32.

The forward hanger 20 is secured to the underside of the vehicle chassis 12 in a convention manner, for example by welding. A transverse rod (not shown) is secured to the hanger 20 and extends laterally beneath the vehicle chassis to the like forward hanger on the right side of the chassis to which it is rigidly connecting, adding reinforcement to both the left and right hangers. A wear pad 36 is provided in the interior of the forward hanger 20.

The leaf spring 30 shown in FIG. 1 is formed of a plurality of leaves with a forward end of the spring engaging against the forward hanger wear pad 36. The rearward end of the leaf spring is mounted to the forward end of the bolster beam 24 as will be described. The rearward end is provided with a bend 38 which maintains its mounting to the bolster beam. The forward drive axle 14 is secured to the leaf spring 30 in an overslung fashion by a U-bolt fastener 40. In the preferred embodiment of the invention the U-bolt fastener 40 connects the forward axle 14 to the leaf spring 30 with the axle displaced from the center of the leaf spring toward the leaf spring rearward end. This results in the leaf spring being asymmetric with a greater proportion of the vehicle load being supported on the rearward end of the leaf spring than the proportion of the vehicle load supported on the forward end of the leaf spring. This enables the suspension system of the invention to distribute the vehicle load over both the forward and rearward drive axles of the vehicle, as will be explained.

Secured to the forward axle 14 is a bracket 42. The bracket is rigidly secured to the axle, for example by welding. The rearward end of the radius rod 32 is connected to the bracket 42 for pivoting movement of the rod relative to the bracket. The rod may be connected to the bracket in a conventional manner, for example by a bushing. As seen in FIG. 1, the bracket 42 extends from the upper side of the axle 14 forward to where it is connected to the radius rod 32. The forward end of the radius rod 32 is connected to the forward hanger 20 for pivoting movement of the rod relative to the hanger. The connection between the forward end of the rod 32 and the forward hanger 20 may be provided by a bushing in a conventional manner. The connection of the radius rod 32 between the axle bracket 42, which is connected to the forward axle 14 above its center axis, and the forward hanger 20 distributes or transmits a large portion of the driving torque exerted on the forward axle at start-up of the vehicle or during vehicle upshifting to the forward hanger 20. For example, on start-up of vehicle driving operations power delivered to the vehicle wheels (not shown) to drive the vehicle forward or to the left in the drawing figure will rotate the wheels counterclockwise. This, in turn, exerts a clockwise torque on the vehicle drive axles 14, 16. The clockwise torque on the forward axle is resisted by the radius rod 32 which, because the axle bracket is connected to the axle 14 above its center axis, is pulled in tension by the torque. In this manner, torsional forces exerted on the leaf spring 30 are significantly reduced.

Like the forward hanger, the rearward hanger 22 is secured to the vehicle chassis 12 in a conventional manner, for example by welding. A transverse rod 48 is secured to the rearward hanger 22 and extends laterally across the underside of the vehicle chassis to the right side of the chassis where it is secured to a like rearward hanger of the suspension system on the right side of the vehicle chassis. The bolster beam 24 is secured to the rearward hanger 22 for pivoting movement of the bolster beam relative to the hanger. The bolster beam may be mounted to the hanger for pivoting movement by a bushing in a conventional manner. The bolster beam has a forward end 50 that projects beyond the rearward hanger 22 and a rearward end 52 that projects behind the hanger. The forward end 50 of the bolster beam is formed with a pair of laterally spaced side flanges 54 and with a wear pad 56 connected between the top edges of the two side flanges. The bend 38 in the rearward end of the leaf spring 30 engages against the wear pad 56 and a transverse pin 58 is connected between the side flanges 54 beneath the leaf spring bend 38 thereby mounting the rearward end of the leaf spring to the forward end of the bolster beam. The mounting of the leaf spring rearward end to the forward end of the bolster beam in this manner permits the leaf spring rearward end to move relative to the bolster beam forward end sliding against the wear pad 56 with the transverse pin 58 preventing the leaf spring rearward end from separating from the bolster beam forward end.

The torque beam 26 has opposite forward 60 and rearward ends 62 with the forward end being connected to the rearward hanger 22 for pivoting movement of the torque beam relative to the hanger. The torque beam 26 is connected to the rearward hanger 22 by a bushing assembly in a conventional manner such as that disclosed in U.S. Pat. No. 5,127,668. The single bushing connection of the torque beam 26 to the rearward hanger 22 is an improvement over the prior art trailer suspension systems of the type disclosed in U.S. Pat. No. 4,741,553 in that only a single bushing is required to connect the rearward drive axle 16 of the vehicle to the rearward hanger 22. The rearward drive axle 16 is secured to the torque beam 26 by welds in an underslung fashion. The rigid connection of the rearward drive axle to the torque beam is capable of withstanding the torsional forces exerted on the axle during driving operations where the double bushing connection of the prior art would fail after a short period of use. A shock absorber 64 is connected between the rearward end 52 of the bolster beam and the rearward end 62 of the torque beam. The air spring 28 is also connected between the rearward end 52 of the bolster beam and the rearward end 62 of the torque beam.

The connections of the shock absorber 64 and air spring 28 between the torque beam and bolster beam contribute to the suspension system of the invention shown in FIG. 1 being able to automatically distribute varying vehicle loads to the forward and rearward drive axles of the vehicle. For example, in driving operation of the vehicle, should a load exerted on the vehicle chassis cause the forward axle 14 to move upward relative to the chassis 12, the rearward end 38 of the leaf spring will exert an upward force against the wear pad 56 at the forward end 50 of the bolster beam. This upward force exerted on the forward end of the bolster beam causes it to pivot about its bushing connection to the rearward hanger 22 resulting in the rearward end 52 of the bolster beam moving downward. The downward movement of the bolster beam rearward end 52 pushes downward on the air spring 28 and the rearward end 62 of the torque beam causing the rearward axle 16 to move downward, thereby counteracting the force of the vehicle load that originally caused the forward axle 14 to move upward. In this manner the suspension system of the invention shown in FIG. 1 distributes the vehicle load between both the forward and rearward drive axles. In a like manner, a change in vehicle load causing the rearward drive axle 16 to move upward relative to the chassis 12, causes the rearward end 62 of the torque beam to move upward. The upward movement of the torque beam rearward end is transmitted through the air spring 28 to the bolster beam rearward end 52 causing the bolster beam to pivot about its bushing connection to the rearward hanger 22 resulting in the bolster beam forward end 50 moving downward. The downward movement of the bolster beam forward end 50 pushes the leaf spring rearward end 38 downward which in turn causes the forward drive axle 14 to move downward counteracting the load that caused the rearward axle 16 to move upward.

Referring to FIG. 2, the second embodiment of the suspension system 70 of the invention is very similar to the first described embodiment of FIG. 1 except for the positioning of the radius rod 72. The second embodiment of the suspension system is generally comprised of a forward hanger 74, a rearward hanger 76, a bolster beam 78, a torque beam 80, an air spring 82, a leaf spring 84, and the radius rod 72. The forward and rearward hangers 74, 76 are substantially identical to the forward and rearward hangers of the first described embodiment and are secured to the vehicle chassis 12 in substantially the same manner as the first described embodiment. The leaf spring 84 differs from the spring of the first embodiment in that it is comprised of a single leaf, as opposed to the plurality of leaves which made up the leaf spring 30 of the first embodiment. The leaf spring 84 is connected between the forward hanger 74 and the bolster beam 78 in the same manner as the first described embodiment.

The forward axle 14 is connected to a forward axle bracket 86, the structure of which is different from that of the first described embodiment. The bracket is rigidly secured to the axle by a pair of U-bolts 88 that connect the axle to the leaf spring 84. The forward end of the radius rod 72 is connected to the bracket 86 for pivoting movement of the rod relative to the bracket. The rod may be connected to the bracket in a conventional manner, for example by a bushing. As seen in drawing FIG. 2, the bracket 86 extends rearwardly from the underside of the forward axle 14 to where it is connected to the forward end of the radius rod 72. The rearward end of the radius rod 72 is connected to the rearward hanger 76 for pivoting movement of the rod relative to the hanger. A second bracket 90 is secured to the forward facing surface of the rearward hanger 76 and the rearward end of the radius rod 72 is connected to the second bracket 90 for pivoting movement of the rod relative to the bracket and rearward hanger. The connection of the radius rod 72 between the axle bracket 86, which is connected to the forward axle 14 beneath its center axis, and the rearward hanger 76 distributes or transmits a large portion of the driving torque exerted on the forward axle at start up of the vehicle or during vehicle upshifting to the rearward hanger 76. For example, on start up of vehicle driving operations power delivered to the vehicle wheels (not shown) to drive the vehicle forward or to the left as seen in the drawing figure, will rotate the wheels counterclockwise. This in turn exerts a clockwise torque on the vehicle drive axles 14, 16. The clockwise torque on the forward axle 14 is resisted by the radius rod 72 which, because the axle bracket 86 is connected to the underside of the axle 14 below its center axis, is pulled in tension by the torque. In this manner, torsional forces exerted on the leaf spring 84 are significantly reduced.

The bolster beam 78 is secured to the rearward hanger 76 for pivoting movement as in the first embodiment. Also as in the first embodiment, the forward end of the bolster beam is formed with a pair of laterally spaced side flanges 92 and with a wear pad 94 connected between the side flanges. The bend 96 in the rearward end of the leaf spring 84 engages against the wear pad 94 and a transverse pin 98 is connected between the side flanges 92 beneath the leaf spring bend, thereby mounting the rearward end of the leaf spring to the forward end of the bolster beam.

The forward end of the torque beam 80 is connected to the rearward hanger 76 by a bushing assembly in the same manner as the first described embodiment. Unlike the first embodiment, the rear axle 16 is rigidly secured to the torque beam 80 by an axle seat assembly 100 and U-bolts 102 securing the axle 16 to the axle seat assembly.

The embodiment of the suspension system of the invention shown in FIG. 2 functions substantially identically to the first described embodiment in automatically distributing varying vehicle loads to the forward and rearward drive axles of the vehicle.

In variant embodiments of the invention and depending on the particular application of the suspension system, a second radius rod 104 may be mounted between the differential housing 106 and the vehicle chassis 12 in a conventional manner forming a parallelogram suspension linkage between the forward axle 14 of the vehicle and the vehicle chassis 12 as shown in FIG. 4.

The embodiments of the invention shown in FIGS. 3–5 are substantially identical to the embodiment of FIG. 2 with most of the component parts of the suspension systems having only differences in their configurations. The functioning of the suspension systems of FIGS. 3–5 remains identical to that of the FIGS. 1 and 2 embodiments of the suspension system described above. Like component parts of the FIGS. 3–5 embodiments of the suspension system to those parts of the FIG. 2 embodiment are given like reference numerals followed by a prime ('), a double prime ("), or a triple prime ('"), respectively.

The variant embodiments of the suspension system of the invention shown in FIGS. 3–5 are provided to show that modifications of the system may be made without departing from the scope of the invention defined by the claims. For example, each of the drawing figures disclose that the particular configurations of the forward and rearward hangers may be varied to suit the particular application of the suspension system. In a like manner, the leaf spring of the forward drive axle may also be varied with the spring comprising one leaf as shown in FIG. 2, or pluralities of leaves as shown in FIGS. 1, 4 and 5. Also, the forward and rearward ends of the leaf spring may be varied with bends being provided at both ends as shown in FIGS. 2, 4 and 5 to mount the leaf spring ends to the forward hanger and bolster beam, respectively. The suspension system of the invention may be employed with forward drive axles having varying cross section configurations as shown in the drawing figures, and the drive axles may be secured to the leaf spring employing various different types of U-bolt connectors as is conventional in the art.

The suspension system of the invention may be employed with various different types of torque beams mounting the rearward drive axle of the vehicle as is displayed in the drawing figures. FIGS. 1 and 2 show a rigid torque beam having the rearward drive axle mounted thereto by welds shown in FIG. 1, and by U-bolts and an axle seat bracket shown in FIG. 2. What is meant by a rigid beam is a beam constructed in a manner to enhance its resistance to torsional twisting of the beam about its longitudinal axis. With the use of rigid torque beams in the suspension system of the invention it may be necessary to use a larger bushing connecting the forward end of the torque beam to the rearward hanger 22, 76. To enhance the deflection characteristics of the bushing to enable the torque beam to twist about its longitudinal axis during driving operations a bushing of the type disclosed in U.S. Pat. No. 5,127,668 may be preferred.

Alternatively, the torque beam employed with the suspension system of the invention mounted to the rearward drive axle may be a torsion spring type beam shown in FIGS. 3 and 4. The torsion spring type beam is constructed in a similar manner to a leaf spring having a plurality of leaves with the forward end of the spring being configured as a cylindrical sleeve to receive a bushing mounting the spring beam to the rearward hanger. Torsional spring beams of the type shown in FIGS. 3 and 4 are specifically designed to permit increased torsional twisting of the spring about its longitudinal axis than does the construction of a rigid beam type torque beam shown in FIGS. 1 and 2. Because the torsional spring type beam shown in FIGS. 3 and 4 permits more torsional twisting of the beam it does not require as large a bushing to connect the beam to the rearward hanger. The variant embodiments of the invention shown in FIGS. 3 and 4 also show rearward drive axles having different cross sectional configurations mounted to the torque beam by different types of U-bolt connectors in a conventional manner.

In each of the variant embodiments of the invention shown in FIGS. 1–5 the forward drive axle is connected by a radius rod to either the forward or rearward hanger. The addition of the radius rod connected between the forward drive axle and the hangers causes the rod to be subjected to tensile forces in response to a driving torque being exerted on the forward drive axle during initial forward drive start-up of the vehicle and during forward shifting of the vehicle transmission, thereby serving to reduce the transmission of these torsional forces to the leaf spring mounting the forward drive axle. The particular construction of the tandem drive axle suspension system of the invention described above better suits the suspension system for use with tandem axle vehicles where both vehicle axles are drive axles than prior art tandem axle suspension systems that are specifically designed for use with trailer tag axles.

FIG. 5 shows a further improvement to the tandem axle suspension system of the invention which employs a torque spring 80''' secured to the rear drive axle 16'''. As seen in FIG. 5, the forward end of the torque spring 80''' is secured to a conventional pivot bushing assembly 110 by a spring bracket 112. FIG. 6 shows a suspension system 114 for a single axle vehicle in which the single axle 116 is mounted to a torque spring 118 and the forward end of the torque spring is secured to a hanger 120 by a spring bracket 122 secured over a conventional pivot bushing assembly 124 mounted to the hanger.

The spring bracket 112 shown in FIG. 5 releasably secures the torque spring 80''' having an overslung axle 16''' secured thereto to the pivot bushing assembly 110 supported by the suspension hanger 76'''. The bracket 112 is comprised of a resilient, cylindrical sleeve 126 that is secured to a plate 128 by a plurality of reinforcing webs or gussets. The plate 128 is releasably secured to the forward end of the torque spring 80''' by a pair of U-bolts 130. The sleeve 126 is provided with a gap extending across the right side of the sleeve as viewed in FIG. 5 parallel to the sleeve center axis. A pair of flanges 132, 134 are formed in the ends of the sleeve 126 at opposite sides of the gap in the sleeve. Nut and bolt fasteners 136 are employed to adjustably close or open the gap between the sleeve flanges 132, 134. With the nut and bolt fasteners 136 removed from the sleeve, a conventional pivot bushing assembly may be inserted through the center of the sleeve 126 and then the fasteners 136 may be attached to the flanges 132, 134 and tightened down to close the sleeve 126 over the exterior of the bushing assembly, thereby securing the bushing assembly in the sleeve. With the bracket 112 attached to the forward end of the torque spring 80''', the pivot bushing 110 may then be secured to the suspension system hanger 76''' to mount the torque spring 80''' to the hanger. It should be appreciated that by providing the spring bracket 112 of the present invention secured to the forward end of the torque spring 80''', the assembly of the pivot bushing 110 to the torque spring and the assembly of both the bushing and torque spring to the hanger 76''' is significantly simplified. Moreover, the spring bracket 112 enables the torque spring 80''' to be removed from the suspension system by removing the U-bolts 130 and without requiring removal of the bushing 110 from the hanger 76'''.

In FIG. 6 the spring bracket 122 of the invention is shown releasably securing a torque spring 118 with an underslung axle 116 mounted thereto to a hanger 120 of a vehicle suspension system. This embodiment of the spring bracket 122 illustrates that the bracket may be used to releasably mount a torque spring 118 of a suspension system for a single axle vehicle to the suspension system's hanger 120. Like the first described embodiment, the spring bracket 122 is comprised of a resilient, cylindrical sleeve 140 secured to a plate 142 by a plurality of reinforcing gussets 144. The plate 142 is secured to the forward end of the torque spring 118 by a pair of U-bolts 146. A pin 148 projects from the plate 142 and engages in a hole 150 through the forward end of the torque spring 118. The engagement of the pin 148 in the hole 150 prevents the forward end of the torque spring 118 from being pulled out of its connection to the spring bracket 122 by the U-bolts 146. As in the embodiment shown in FIG. 5, the cylindrical sleeve 140 has a gap along its side extending parallel to the center axis of the sleeve. A pair of flanges 152, 154 are formed in the opposed ends of the sleeve on opposite sides of the gap. Threaded fasteners 156 are connected between the flanges 152, 154 and adjustably open and close the gap between the flanges. By tightening down the nut and bolt fasteners 156, the gap between the flanges 152, 154 is closed and the sleeve 140 is securely engaged over the exterior of a bushing assembly 124, thereby mounting the forward end of the torque spring 118 to the hanger 120. By removing the nut and bolt fasteners 156, the gap between the flanges 152, 154 widens due to the resiliency of the sleeve 140 and the bushing 124 may then be removed from within the sleeve. By removing the U-bolts 146 connecting the forward end of the torque spring 118 to the bracket plate 142, the torque spring may be removed from the bracket without disassembling the bracket from the suspension system hanger 120.

While the present invention has been described by reference to specific embodiments, it should be understood that modifications and variations of the invention may be constructed without departing from the scope of the invention defined in the following claims.

What is claimed is:

1. A suspension system for a vehicle having a chassis, a forward axle and a rearward axle, the system comprising:
   a forward hanger connected to a vehicle chassis;
   a rearward hanger connected to the vehicle chassis;
   a leaf spring having opposite forward and rearward ends, the forward end being mounted to the forward hanger;
   a forward axle mounted on the leaf spring;
   the forward axle is a drive axle and the rearward axle is a drive axle;
   a radius rod connected between the forward axle and one of the forward and rearward hangers;
   a bolster beam mounted on the rearward hanger, the bolster beam having opposite forward and rearward ends with the rearward end of the leaf spring being mounted on the forward end of the bolster beam;
   an air spring mounted on the rearward end of the bolster beam;
   a torque beam having opposite forward and rearward ends with the forward end being mounted on the rearward hanger and the air spring being mounted between the torque beam and the bolster beam; and,
   a rearward axle rigidly secured on the torque beam.

2. The suspension system of claim 1, wherein:
   a single bushing connects the rearward axle and the torque beam to the rearward hanger.

3. The suspension system of claim 2, wherein:
   the torque beam is a torque spring.

4. The suspension system of claim 2, wherein:
   the torque beam is a rigid beam.

5. The suspension system of claim 1, wherein:
   the radius rod is connected between the forward drive axle and the rearward hanger and is subjected to tensile forces on operation of the forward drive axle.

6. The suspension system of claim 1, wherein:
   the forward axle is mounted on the leaf spring asymmetrically relative to the forward and rearward ends of the leaf spring resulting in the forward and rearward ends of the leaf spring supporting different proportions of a vehicle load.

7. The suspension system of claim 1 wherein:
   the forward axle is a drive axle having a center axis extending across the chassis; and
   the radius rod is connected between the forward drive axle and the forward hanger, the radius rod having opposite forward and rearward ends with the rearward end being connected substantially above the forward axle center axis.

8. The suspension system of claim 1 wherein:
   the forward axle is a drive axle having a center axis extending across the chassis; and
   the radius rod is connected between the forward drive axle and the rearward hanger, the radius rod having opposite forward and rearward ends with the forward end being connected substantially below the forward axle center axis.

9. The suspension system of claim 1 wherein:
   the forward axle is mounted on the leaf spring closer to the leaf spring rearward end than the leaf spring forward end resulting in the leaf spring transferring a greater amount of a forward axle load to the bolster beam than to the forward hanger.

10. A suspension system for a vehicle having a chassis, a forward axle end a rearward axle, the system comprising:
    a forward hanger connected to a vehicle chassis;
    a rearward hanger connected to the vehicle chassis;
    a leaf spring having opposite forward and rearward ends, the forward end being mounted to the forward hanger;
    a forward axle mounted on the leaf spring;
    a radius rod connected between the forward axle and one of the forward and rearward hangers;
    a bolster beam mounted on the rearward hanger, the bolster beam having opposite forward and rearward ends with the rearward end of the leaf spring being mounted on the forward end of the bolster beam;
    an air spring mounted on the rearward end of the bolster beam;
    a torque beam having opposite forward and rearward ends with the forward end being mounted on the rearward hanger and the air spring being mounted between the torque beam and the bolster beam;
    a rearward axle rigidly secured on the torque beam;
    a single bushing connects the rearward axle and the torque beam to the rearward hanger; and
    the forward end of the bolster beam extends over the rearward end of the leaf spring and the rearward end of radius rod is connected to the rearward hanger beneath the rearward end of the leaf spring end the forward end of the bolster beam.

11. A suspension system for a vehicle having a chassis, a forward axle and a rearward axle, the system comprising:
    a forward hanger connected to a vehicle chassis;
    a rearward hanger connected to the vehicle chassis;
    a leaf spring having opposite forward and rearward ends, the forward end being mounted on the forward hanger;
    a forward drive axle mounted on the leaf spring for distributing a driving torque of the axle to the leaf spring on driving operation of the forward drive axle;
    a radius rod connected between the forward drive axle and the rearward hanger to be subjected to a tensile force on driving operation of the forward drive axle and thereby reduce the driving torque of the forward axle distributed to the leaf spring;
    a bolster beam mounted on the rearward hanger, the bolster beam having opposite forward and rearward ends with the rearward end of the leaf spring being mounted to the forward end of the bolster beam;
    an air spring mounted to the rearward end of the bolster beam;
    a torque beam having opposite forward and rearward ends with the forward end being mounted to the rearward hanger and the air spring mounted between the torque beam and the bolster beam; and, a rearward drive axle mounted to the torque beam for distributing a driving torque of the rearward drive axle to the torque beam on driving operation of the rearward drive axle.

12. The suspension system of claim 11, wherein:

the rearward drive axle is rigidly secured to the torque beam and a single bushing connects the rearward drive axle and the torque beam to the rearward hanger.

13. The suspension system of claim 12, wherein:

the torque beam is a torque spring.

14. The suspension system of claim 12 wherein:

the forward axle is mounted on the leaf spring closer to the leaf spring rearward end than the leaf spring forward end resulting in the leaf spring transferring a greater amount of a forward axle load to the bolster beam than to the forward hanger.

15. The suspension system of claim 12, wherein:

the torque beam is a rigid beam.

16. The suspension system of claim 12, wherein:

the forward end of the bolster beam extends over the rearward end of the leaf spring and the rearward end of the radius rod is connected to the rearward hanger beneath the rearward end of the leaf spring and the forward end of the bolster beam.

17. The suspension system of claim 12, wherein:

the forward axle is mounted on the leaf spring asymmetrically relative to the forward and rearward ends of the leaf spring resulting in the forward and rearward ends of the leaf spring supporting different proportions of a vehicle load.

18. A suspension system for a vehicle having a chassis, a forward drive axle and a rearward drive axle, the system comprising:

a forward hanger connected to the vehicle chassis;

a rearward hanger connected to the vehicle chassis;

a leaf spring having opposite forward and rearward ends, the forward end being mounted to the forward hanger;

a forward drive axle mounted on the leaf spring for distributing a driving torque of the axle to the leaf spring on driving operation of the forward drive axle;

a radius rod connected between the forward drive axle and the rearward hanger to be subjected to a tensile force on driving operation of the forward drive axle and thereby reduce the driving torque of the forward drive axle distributed to the leaf spring;

a bolster beam mounted on the rearward hanger, the bolster beam having opposite forward and rearward ends with the rearward end of the leaf spring being mounted to the forward end of the bolster beam;

an air spring mounted to the rearward end of the bolster beam;

a torque beam having opposite forward and rearward ends with the forward end being mounted to the rearward hanger and the air spring being mounted between the torque beam and the bolster beam; and, a rearward drive axle rigidly secured to the torque beam for distributing a driving torque of the rearward drive axle to the torque beam on driving operation of the rearward drive axle.

19. The suspension system of claim 18, wherein:

a single bushing connects the rearward drive axle and the torque beam to the rearward hanger.

20. The suspension system of claim 19, wherein:

the torque beam is a torque spring.

21. The suspension system of claim 19 wherein:

the forward axle is mounted on the leaf spring closer to the leaf spring rearward end than the leaf spring forward end resulting in the leaf spring transferring a greater amount of a forward axle load to the bolster beam than to the forward hanger.

22. The suspension system of claim 19, wherein:

the torque beam is a rigid beam.

23. The suspension system of claim 19, wherein:

the forward axle is mounted on the leaf spring asymmetrically relative to the forward and rearward ends of the leaf spring resulting in the forward and rearward ends of the leaf spring supporting different proportions of a vehicle load.

24. The suspension system of claim 19, wherein:

the forward end of the bolster beam extends over the rearward end of the leaf spring and the rearward end of the radius rod is connected to the rearward hanger beneath the rearward end of the leaf spring and the forward end of the bolster beam.

25. A suspension system for a vehicle having a chassis and at least one axle, the suspension system comprising:

a hanger connected to a vehicle chassis;

a pivot bushing assembly connected to the hanger;

a torque spring having opposite forward and rearward ends;

a vehicle axle mounted on the torque spring; and, a spring bracket releasably connected to the torque spring adjacent the forward end of the torque spring, thereby enabling the torque spring to be disassembled and separated from the spring bracket, the spring bracket including an adjustable, resilient sleeve that is closed over the pivot bushing assembly to releasably connect the spring bracket to the bushing assembly, thereby enabling the torque spring and spring bracket to be disassembled and separated from the pivot bushing assembly.

26. The suspension system of claim 25, wherein:

the vehicle axle is mounted on the torque spring in an overslung manner.

27. The suspension system of claim 25, wherein:

the vehicle axle is mounted on the torque spring in an underslung manner.

28. The suspension system of claim 25, wherein:

the spring bracket is connected to the torque spring by at least one fastener connected between the spring bracket and torque spring, whereby the fastener may be removed from the spring bracket and torque spring to disassemble and separate the torque spring from the spring bracket.

29. The suspension system of claim 28, wherein:

the fastener is a U-bolt.

30. The suspension system of claim 25, wherein:

the sleeve has a resilient, cylindrical wall extending around a center axis of the sleeve, the wall having opposite ends separated by a gap, and means are provided on the spring bracket for selectively closing the gap and thereby closing the sleeve over the pivot bushing assembly, and for opening the gap to remove the pivot bushing assembly from the sleeve.

31. The suspension system of claim 30, wherein:

the means for selectively closing and opening the gap includes at least one nut and bolt fastener connected to the sleeve across the gap.

* * * * *